(12) United States Patent
Struble

(10) Patent No.: US 6,171,542 B1
(45) Date of Patent: Jan. 9, 2001

(54) METHOD AND APPARATUS FOR THE MANUFACTURE OF BLOWN PLASTIC CONTAINERS

(75) Inventor: Douglas S. Struble, Maumee, OH (US)

(73) Assignee: Owens-Brockway Plastic Products Inc., Toledo, OH (US)

( * ) Notice: Under 35 U.S.C. 154(b), the term of this patent shall be extended for 0 days.

(21) Appl. No.: 09/306,501

(22) Filed: May 6, 1999

(51) Int. Cl.$^7$ .............................. B29C 49/36; B29C 49/70
(52) U.S. Cl. ........................ 264/543; 264/334; 425/537; 425/540; 425/444
(58) Field of Search .................................. 425/537, 540, 425/444; 264/543, 334

(56) References Cited

U.S. PATENT DOCUMENTS

| | | | |
|---|---|---|---|
| 3,025,561 * | 3/1962 | Ruekberg et al. | 425/537 |
| 3,570,058 * | 3/1971 | Heinig et al. | 425/537 |
| 3,642,417 * | 2/1972 | Von Holdt | 425/444 |
| 3,797,985 * | 3/1974 | Garver | 425/537 |
| 5,454,708 * | 10/1995 | Boenig et al. | 425/537 |
| 5,736,170 * | 4/1998 | Stoner | 425/537 |

FOREIGN PATENT DOCUMENTS 55-126428 * 9/1980 (JP) ........................................ 425/537

9-254202 * 9/1997 (JP).

* cited by examiner

*Primary Examiner*—Robert Davis

(57) ABSTRACT

Wheel molding apparatus for molding thermoplastic containers or other articles, the apparatus having a multiplicity of sets (10) of opposed, separable radially aligned mold halves (12, 14) that travel in a circular path about a horizontal axis. The inner of the mold halves (14) is separated from the outer of the mold halves (12) at the 12:00 o'clock position of the mold set that includes such mold halves to permit the molded article to be ejected from the mold set. However, the ejection of the molded article should not take place until after the separation of the mold halves, and this requires that the molded article be positively retained within the outer mold half until it is desired to eject the article therefrom. This is accomplished by translation of a translatable pin (16) within a passage (18) of the outer mold half, the translatable pin having an undercut (20) near an end thereof that extends into the article, and preferably into a portion of excess material thereof, and forms an interference fit with the article at an outermost position of the translatable pin, to which the pin is resiliently biased by a spring (22). Ejection of the article is obtained by engaging an exterior free end of the pin by a cam (24) to move the pin against the biasing effect of the spring to a second position at which there will be no interfering relationship between the pin and the article and the pin will then positively eject the article from the outer mold half.

6 Claims, 2 Drawing Sheets

METHOD AND APPARATUS FOR THE MANUFACTURE OF BLOWN PLASTIC CONTAINERS

FIELD OF THE INVENTION

This invention relates to the manufacture of blown plastic containers. More particularly, this invention relates to the manufacture of blown plastic containers by a molding machine of the wheel type in which each container is molded in a cavity defined by an opposed pair of separable radially aligned mold halves with a multiplicity of such pairs of mold halves being mounted in a circumferential array by a rotary member that is rotated in a vertical plane about a horizontal axis.

BACKGROUND OF THE INVENTION

Blown plastic containers that are manufactured on a wheel type molding machine are usually separated from the mold sets in which they are formed when each mold set is at the 12:00 o'clock position on the mold machine. At this location, when the radially aligned mold halves are vertically aligned, the lower mold half is separated from the upper mold half to allow the molded container to be separated from the mold set.

However, it is desired that the container remain with the upper mold half until a subsequent position of the mold set carrying wheel, and notwithstanding the force of gravity that would otherwise cause the container to fall from the upper mold half.

Heretofore, this problem has been addressed by including a fixed retention element as part of the upper mold half, the retention element having an undercut near an inner end thereof that engages a portion of the molded article in an interference fit. Unfortunately, the molded article must then be stripped from the mold half that has the retention element, and the quality of the ejection of the container from such mold half during such stripping is inconsistent and often requires remachining of the undercut in the retention element to achieve acceptable ejection of the molded article.

BRIEF DESCRIPTION OF THE INVENTION

According to the present invention, there is provided an apparatus for, and a method of, molding a thermoplastic container or other article in which the article is positively ejected from a half of a set of opposed mold halves in which the article was formed after the mold halves separate to permit the article to be removed and in which such ejection does not require stripping of the article from any element of the molding equipment. According to this invention, the article is positively retained by one of the mold halves, specifically, by the upper mold half of a set of radially aligned mold halves when the sets are at or near the 12:00 o'clock position of the travel in a circular path in a vertical plane where the lower mold half is separated from the upper mold half by a camming action. The retention of the article in the mold half in which it is to be retained is by way of a translatable pin that extends through such mold half to engage a portion of the article being molded, preferably a portion in the flash or other excess material that will be trimmed from the article in a subsequent operation after removal of the article from the molding machine.

The translatable pin is provided with an undercut near an end that engages the article being formed in an interference fit with such article to positively retain the article within the mold half that carries such pin, and the translatable pin is resiliently urged to a position in which it will remain in such an interference fit. However, when the translatable pin is translated to a position in which it extends further into the mold cavity in which the article is being molded, for example, by a camming action that acts on an opposed end of the translatable pin, the translatable pin will deflect the article being molded from the axis it occupied during molding, and this will eliminate the interference fit between the article and the undercut of the translatable pin and result in positive disengagement or ejection of the article from the mold half in which it had been retained, without stripping and at a desired location in the path of travel of the article.

By virtue of the translatability of the translatable pin, a more positive interference fit can be provided between the molded article and the translatable pin than was the case in prior art arrangements where the article was retained by an interference fit with an undercut in a fixed element of the mold half in which it was to be retained, because translation of the translatable pin ultimately will eliminate the interference between the translatable pin and the article, whereas an interference fit will always exist between the article and an undercut in a fixed element of the mold half, and in such an arrangement it was necessary to limit the degree of the interference fit to minimize difficulties encountered in stripping the article from the mold half.

Accordingly, it is an object of the present invention to provide an improved method of, and apparatus for, the manufacture of blown plastic containers and other articles. More particularly, it is an object of the present invention to provide an improved method and apparatus of the foregoing character for the manufacture of blown plastic containers and other articles by a process, and an apparatus, in which each container is molded in a radially aligned set of mold halves that rotate in a vertical plane about a horizontal axis. Even more particularly, it is an object of the present invention to provide an improved method and apparatus of the foregoing character in which the molded article is positively retained in a half of such set of mold halves after separation of the mold halves and is subsequently ejected from such mold half without stripping.

For a further understanding of the present invention and the objects thereof, attention is directed to the drawing and the following brief description thereof, to the detailed description of the preferred embodiment and to the appended claims.

DETAILED DESCRIPTION OF THE PREFERRED EMBODIMENT

Apparatus according to the preferred embodiment of the present invention includes a plurality of mold sets 10, each mold set 10 including opposed mold halves 12, 14 that define a cavity in which a container C or other article is molded from a suitable thermoplastic material, for example, polypropylene. The mold sets 10 are arranged end to end and are rotated in a circular path in a vertical plane by apparatus, not shown, with the mold halves 12, 14 of each mold set being radially aligned with respect to one another.

Figure 1:
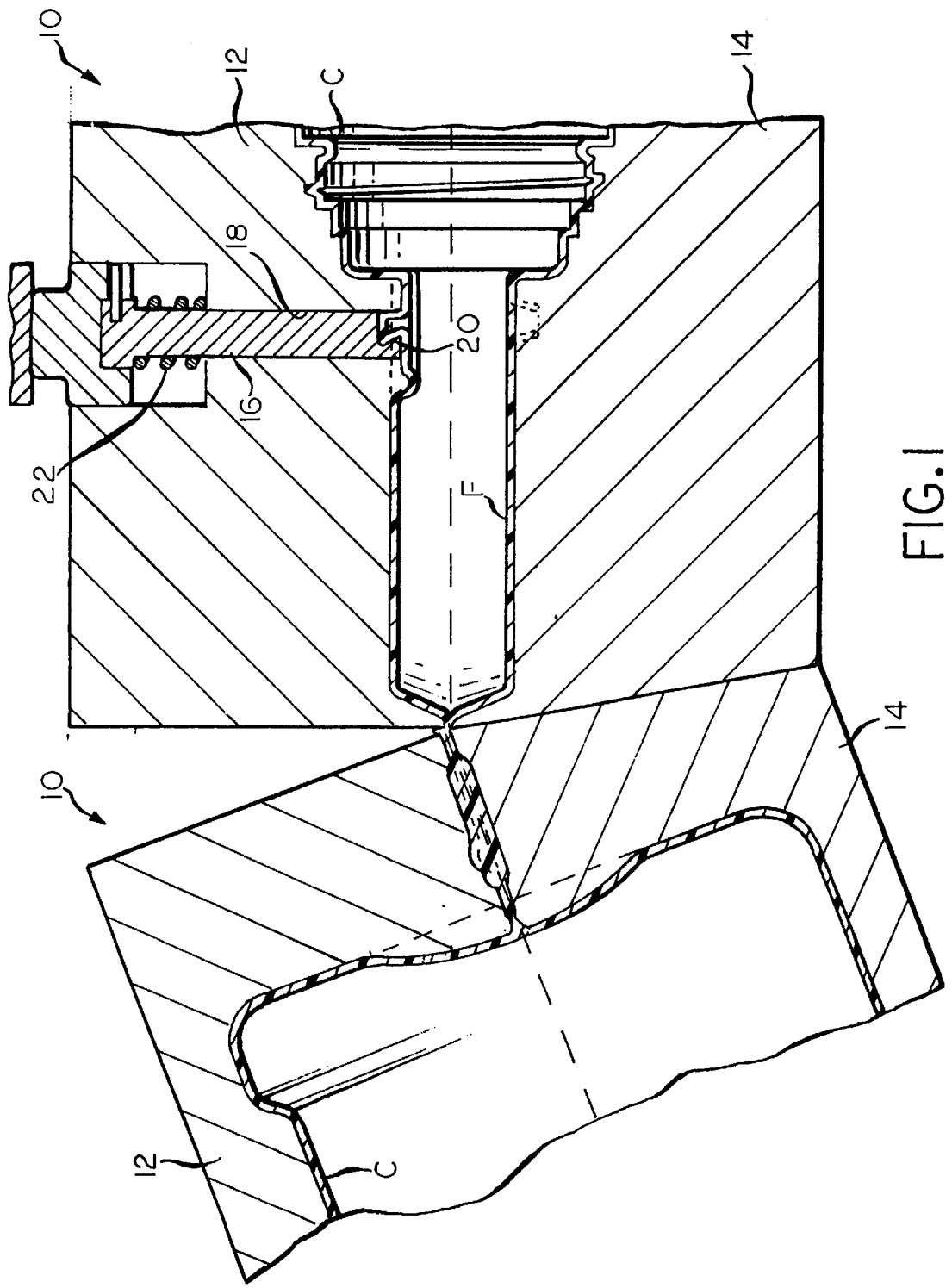
FIG. 1 is a fragmentary elevational view, in cross section, of a preferred embodiment of apparatus for the practice of the present invention at a time in the cycle of operation of such apparatus.
Figure 2:
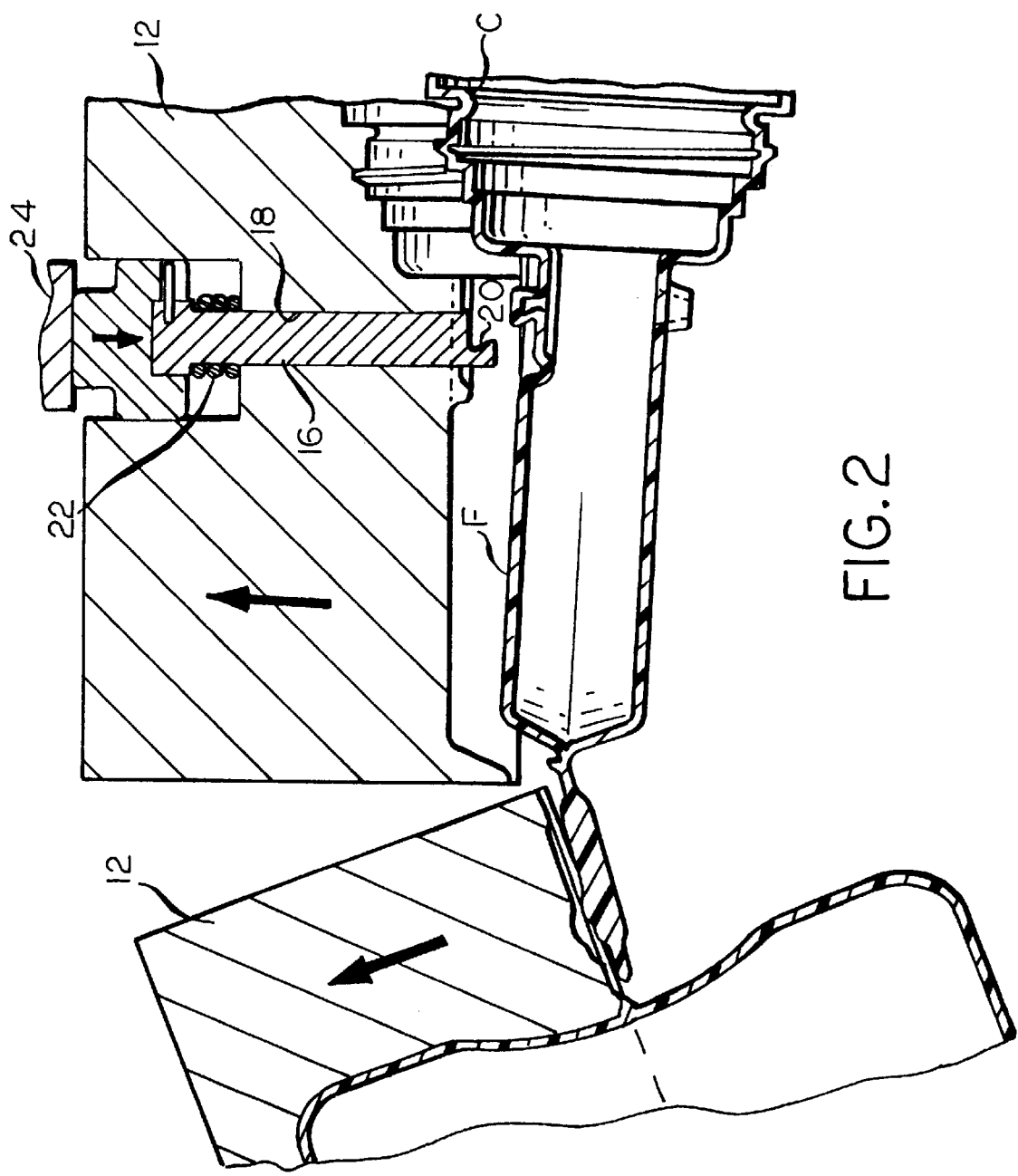
FIG. 2 is a view similar to FIG. 1 showing the apparatus at a subsequent time in its cycle of operation.

At a predetermined location in the circular path of travel of the mold set 10, typically at the 12:00 o'clock position of the mold set, when the mold halves 12, 14 of the mold set 10 are vertically aligned, the inner of the mold halves 12, 14, shown as the mold half 14, will be caused to separate from the outer of the mold halves, shown as the upper mold half 12, for example, by camming the mold half 14 away from the mold half 12. This condition, after total separation of the mold half 14 from the mold half 12, is shown in FIG. 2. The purpose of the separation of the mold halves 12, 14 is to permit the article C to be removed from the mold set 10 that included such mold halves 12, 14 to permit another article C to be molded in such mold set.

When the mold halves 12, 14 of the mold set 10 separate at the 12:00 o'clock position, as described, the outer mold half 12 will be vertically positioned above the lower mold half 14, and it is desired to retain the article C within the outer mold half 12 for some period of time after the lower mold half 14 has separated therefrom and notwithstanding the effect of gravity that would otherwise cause the article C to disengage from the upper mold half 12. This is done by providing a translatable pin 16 that extends transversely through a passage 18 in the mold half 12, the pin 16 having an undercut 20 near an inner end thereof. The pin 16 is resiliently biased away from the container C by a spring 22, but even at the outermost position of the pin 16 its inner end extends into some portion of the article C, preferably, as shown, into a flash portion F that will ultimately be trimmed from the article C. In this position of the pin 16, thus, there will exist an interference fit between the article C and the undercut 20 of the pin 16, and this interference fit will securely retain the article C in the mold half 12 notwithstanding the effect of gravity that would otherwise tend to disengage the article C from the mold half 12 after separation of the mold half 14 from the mold half 12.

To eject the article C from the mold half 12, the pin 16 is depressed by engagement of a cam 24 against its outer end, and this will cause the pin 16 to advance, against the action of the spring 22, further into the cavity within the mold half 12 in which the article C is engaged. The advance of the pin 16 will be effective to tilt the article C about the axis it had theretofore occupied within the mold half 12, thus, gradually eliminating the interference fit between the article C and the undercut 20 in the pin 16. Further advance of the pin 16, thus, will positively eject the article C from the mold half 12, as shown in FIG. 2, and it will never be necessary to forcibly strip the article C from the pin 16, or from any other portion of the upper mold half 12 for that matter.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

What is claimed is:

1. Apparatus for molding articles from a thermoplastic material, said apparatus comprising:

a plurality of circumferentially spaced mold sets arranged for rotation in a vertical plane, each mold set comprising a radially outermost mold half and a radially innermost mold half, the innermost mold half in each mold set being separable from the outermost mold half in said mold set to permit a container that has been molded therein to be ejected therefrom; and a translatable pin extending through a passage in each radially outermost mold half and being translatable relative to the outermost mold half solely along a rectilinear path relative to said radially outermost mold half, said translatable pin having an undercut near a free end thereof and engaging an article in the mold set that includes such radially outermost mold half in an interference fit, extension of said translatable pin within said radially outermost mold half being effective to move said article away from said radially outermost mold half and to eliminate the interference fit, whereby the article is ejected from said radially outermost mold half.

2. Apparatus according to claim 1 and further comprising:

means for biasing said translatable pin away from said article being molded in each mold set; and cam means for engaging an opposed end of said translatable pin to urge said translatable pin, again the effect of said means for biasing, toward the article being molded in said mold set.

3. The method of retaining and later ejecting a molded plastic article within an outermost mold half of a set of radially aligned separable opposed mold halves, the set of mold halves also having a radially aligned innermost mold half, the method comprising:

engaging the article in an interference fit with an undercut in a translatable member that is translatable with respect to the outermost mold half to retain the article within the mold half in a first position of the translatable member;

moving the innermost mold half away from the outermost mold half while the mold halves in the set are vertically aligned while retaining the article in the outermost mold half; then advancing the set of mold halves to a position where the mold halves are no longer vertically aligned; then advancing the translatable member toward the article to a second position of the translatable member to eliminate the interference fit between the article and the translatable member and to eject the article from the mold half when the translatable member approaches the second position; and then returning the translatable member to the first position the motion of the translatable member from the first position to the second position and then back to the first position relative to the outermost mold half being solely rectilinear in configuration.

4. The method according to claim 3 and further comprising:

a applying a resilient biasing force against the translatable member to translate the translatable member toward the first position; and translating the translatable member toward the second position, against the effect of the biasing force, to eject the article from the mold half.

5. The method according to claim 4 wherein the article is a molded plastic container having a portion of excess material that is to be removed from the container after completion of the molding of the container, and wherein the interference fit between the article and the translatable member occurs between the portion of the excess material and the translatable member.

6. The method according to claim 5:

wherein the set of mold halves is part of a plurality of like sets of mold halves that are rotated in a vertical plane about a horizontal axis; and wherein the molded article in each set of mold halves is physically joined to a like molded article in each adjacent set of mold halves.

* * * * *